(12) United States Patent
Fahrbach et al.

(10) Patent No.: US 11,287,624 B2
(45) Date of Patent: Mar. 29, 2022

(54) LIGHTSHEET MICROSCOPE

(71) Applicant: Leica Microsystems CMS GmbH, Wetzlar (DE)

(72) Inventors: Florian Fahrbach, Mannheim (DE); Werner Knebel, Kronau (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 315 days.

(21) Appl. No.: 16/498,401

(22) PCT Filed: Apr. 10, 2018

(86) PCT No.: PCT/EP2018/059175
§ 371 (c)(1),
(2) Date: Sep. 27, 2019

(87) PCT Pub. No.: WO2018/189187
PCT Pub. Date: Oct. 18, 2018

(65) Prior Publication Data
US 2020/0064608 A1 Feb. 27, 2020

(30) Foreign Application Priority Data

Apr. 10, 2017 (DE) ..................... 10 2017 107 733.2

(51) Int. Cl.
*G02B 21/00* (2006.01)
*G02B 21/06* (2006.01)
(Continued)

(52) U.S. Cl.
CPC ....... *G02B 21/0032* (2013.01); *G02B 21/006* (2013.01); *G02B 21/06* (2013.01); *G02B 21/34* (2013.01); *G02B 21/367* (2013.01)

(58) Field of Classification Search
CPC .. G02B 21/00; G02B 21/0032; G02B 21/006; G02B 21/06; G02B 21/26; G02B 21/34
(Continued)

(56) References Cited

U.S. PATENT DOCUMENTS 9,644,620 B2 * 5/2017 Went ...................... F04B 23/06
9,829,691 B2 11/2017 Otte et al.
(Continued)

FOREIGN PATENT DOCUMENTS

CN 104054014 A 9/2014
DE 202011110077 U1 1/2013
(Continued)

*Primary Examiner* — Thong Q Nguyen
(74) *Attorney, Agent, or Firm* — Leydig, Voit & Mayer, Ltd.

(57) ABSTRACT

A lightsheet microscope includes a detection objective for imaging a target region of a sample located in a focal plane, and an illumination objective for focusing an illumination light beam. The illumination objective and the detection objective define a sample chamber, in which a sample holder having a carrier surface is arranged. A light deflection device has a deflection surface arranged laterally offset in relation to the optical axis of the detection objective in the sample chamber which deflects the illumination light beam through the illumination objective in a direction perpendicular to the optical axis such that the deflected illumination light beam forms a lightsheet-type illumination light distribution. The light deflection device has a collision section facing toward the carrier surface. The carrier surface is inclined relative to the focal plane at a predetermined angle such that a part of the carrier surface is arranged in the focal plane.

17 Claims, 11 Drawing Sheets

(51) Int. Cl.
  *G02B 21/34* (2006.01)
  *G02B 21/36* (2006.01)
(58) Field of Classification Search
  USPC .................................................. 359/368–398
  See application file for complete search history.

(56) References Cited

U.S. PATENT DOCUMENTS

| 10,281,705 | B2 | 5/2019 | Knebel |
| 2009/0174937 | A1 | 7/2009 | Holy et al. |
| 2013/0107358 | A1 | 5/2013 | Knebel et al. |
| 2017/0293131 | A1 | 10/2017 | Paulus et al. |

FOREIGN PATENT DOCUMENTS

| DE | 102012109577 A1 | | 5/2013 |
| DE | 102012110077 A1 | | 6/2014 |
| DE | 10 2013 226 277 | * | 6/2015 |
| DE | 102015114756 A1 | | 3/2016 |
| EP | 2977810 A1 | | 1/2016 |
| EP | 2983029 A1 | | 2/2016 |
| WO | WO 2015030678 A1 | | 3/2015 |

* cited by examiner

LIGHTSHEET MICROSCOPE

CROSS-REFERENCE TO PRIOR APPLICATIONS

This application is a U.S. National Phase Application under 35 U.S.C. § 371 of International Application No. PCT/EP2018/059175, filed on Apr. 10, 2018, and claims benefit to German Patent Application No. DE 10 2017 107 733.2, filed on Apr. 10, 2017. The International Application was published in German on Oct. 18, 2018 as WO 2018/189187 A1 under PCT Article 21(2).

FIELD

The invention relates to a lightsheet microscope, comprising a detection objective for imaging a target region of a sample, which is located in a focal plane of the detection objective, an illumination objective for focusing an illumination light beam in the sample, wherein the detection objective and the illumination objective are opposite to one another with the optical axes thereof aligned perpendicularly in relation to the focal plane and define a sample chamber containing the focal plane between them, a sample holder having at least one carrier surface arranged in the sample chamber, onto which the sample is applicable, and a light deflection device having a deflection surface, which is arranged laterally offset in relation to the optical axis of the detection objective in the sample chamber and is designed to deflect the—preferably focused—illumination light beam through the illumination objective in a direction perpendicular to the optical axis of the detection objective in such a way that the deflected illumination light beam forms a lightsheet-type illumination light distribution focused in the focal plane, wherein the light deflection device has a collision section facing toward the carrier surface, which defines a mechanical stop on the light deflection device for the carrier surface, which prevents a coplanar arrangement of the carrier surface in the focal plane. Furthermore, the present invention relates to a retrofitting kit for a lightsheet microscope.

BACKGROUND

In the recent past, so-called lightsheet microscopes have come to be used in particular in fluorescence microscopy, in which only a very thin layer of the sample is illuminated. In comparison to conventional fluorescence microscopes, lightsheet microscopes thus enable a higher resolution and a lower light stress, whereby undesired effects due to bleaching or light-induced stress in biological samples can be reduced. Lightsheet microscopes are therefore usable particularly advantageously for fluorescence examinations on living organisms.

Various optical arrangements for implementing a lightsheet microscope are known from the prior art. In the context of the present invention, arrangements are to be mentioned in this case in particular in which illumination and detection take place via two separate objectives. In this case, the illumination objective and the detection objective are typically arranged perpendicularly in relation to one another. This perpendicular arrangement of the objectives has the disadvantage in particular, however, that it may not be readily integrated into already existing microscope systems, for example, confocal systems or scanning microscopes.

To avoid this disadvantage, an arrangement was proposed by the applicant with DE 10 2012 109 577 A1, in which the illumination objective and the detection objective, in a departure from the above-mentioned perpendicular arrangement to one another, are opposite to one another along the vertical axis—for example, implemented in an inverse microscope stand. To also be able to generate a lightsheet located perpendicularly in relation to the detection axis in this arrangement, the illumination light beam passing through the illumination objective longitudinally in relation to the vertical stand axis is oriented onto a mirror system, which deflects the illumination light beam at a right angle to illuminate the sample in the horizontally located focal plane of the detection objective in a familiar manner with a lightsheet-type illumination light distribution. The target region of the sample located in the focal plane is then imaged by the detection objective on a camera sensor.

The above-mentioned mirror system consists of two mirror elements, which are arranged at an angle of 45° on both sides of the optical axis of the detection objective. The extension of the respective mirror element measured along the optical axis is established by the beam cross section, which the illumination light beam has at the location of the mirror element. Since the illumination objective is designed to focus the illumination light beam in such a way that it has its smallest extension along the optical axis of the detection objective in the target region of the sample, the beam cross section of the illumination light beam at the location of the respective mirror element is still significantly larger than in the target region of the sample. The mirror element thus has an extension in parallel to the optical axis of the detection objective which at least corresponds to the extension of the beam cross section, which makes a comparatively complex sample preparation necessary. This is because the carrier surface of the employed sample holder, which is typically embodied as a transparent cover glass, thus cannot be positioned exactly in the focal plane of the detection objective illuminated using the lightsheet, since the cover glass collides with the mirror system attached to the detection objective as it approaches the detection objective, before it reaches the focal plane. To compensate for the axial offset resulting therefrom between the carrier surface of the sample holder and the focal plane, the sample has to be prepared on a pedestal arranged on the carrier surface. Although this pedestal is only a few hundred microns tall, it nonetheless makes the sample preparation more difficult, in particular when changing over from a pedestal-free preparation, as is typical, for example, in wide-field microscopy or in confocal microscopy.

With respect to the further prior art, reference is made to the publications Chen, B.-C. et al., "Lattice light-sheet microscopy: imaging molecules to embryos at high spatiotemporal resolution," Science 346, 1257998 (2014); Planchon, T. A. et al., "Rapid three-dimensional isotropic imaging of living cells using Bessel beam plane illumination," Nat. Methods 8, 417 (2011); and Wu, Y. et al., "Inverted selective plane illumination microscopy (iSPIM) enables coupled cell identity lineaging and neurodevelopmental imaging in Caenorhabditis elegans," PNAS 108, 17708 (2011). Arrangements are disclosed in these publications, in which the illumination objective and the detection objective are each located on the same side of the cover glass and are arranged in relation thereto at an angle of 45°.

A lightsheet microscope is disclosed in DE 10 2013 107 297 A1, in which the illumination objective and the detection objective are also arranged on one side of the cover glass, wherein the respective angle at which the illumination objective or the detection objective is aligned with respect to the cover glass is predetermined on the basis of the numeric aperture of the respective objective.

Finally, a lightsheet microscope is known from DE 10 2012 110 077 A1, in which the illumination objective and the detection objective are located on opposing sides of the cover glass. In this case, the detection objective is aligned perpendicularly in relation to the cover glass as usual. In contrast, the illumination objective is inclined in relation to the cover glass.

SUMMARY

In an embodiment, the present invention provides a lightsheet microscope including a detection objective configured to image a target region of a sample, which is located in a focal plane of the detection objective, and an illumination objective configured to focus an illumination light beam in the sample. The illumination objective is disposed opposite to the detection objective with an optical axis of the illumination objective being aligned with an optical axis of the detection objective perpendicularly to the focal plane. The illumination objective and the detection objective define a sample chamber containing the focal plane between the illumination objective and the detection objective. A sample holder having at least one carrier surface is arranged in the sample chamber, on which the sample is applicable. A light deflection device has a deflection surface which is arranged laterally offset in relation to the optical axis of the detection objective in the sample chamber and is configured to deflect the illumination light beam through the illumination objective in a direction perpendicular to the optical axis of the detection objective in such a way that the deflected illumination light beam forms a lightsheet-type illumination light distribution focused in the focal plane. The light deflection device has a collision section facing toward the at least one carrier surface, which defines a mechanical stop on the light deflection device for the carrier surface, which prevents a coplanar arrangement of the carrier surface in the focal plane. The carrier surface is inclined in relation to the focal plane at a predetermined angle of inclination in such a way that a part of the carrier surface is arranged in the focal plane.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
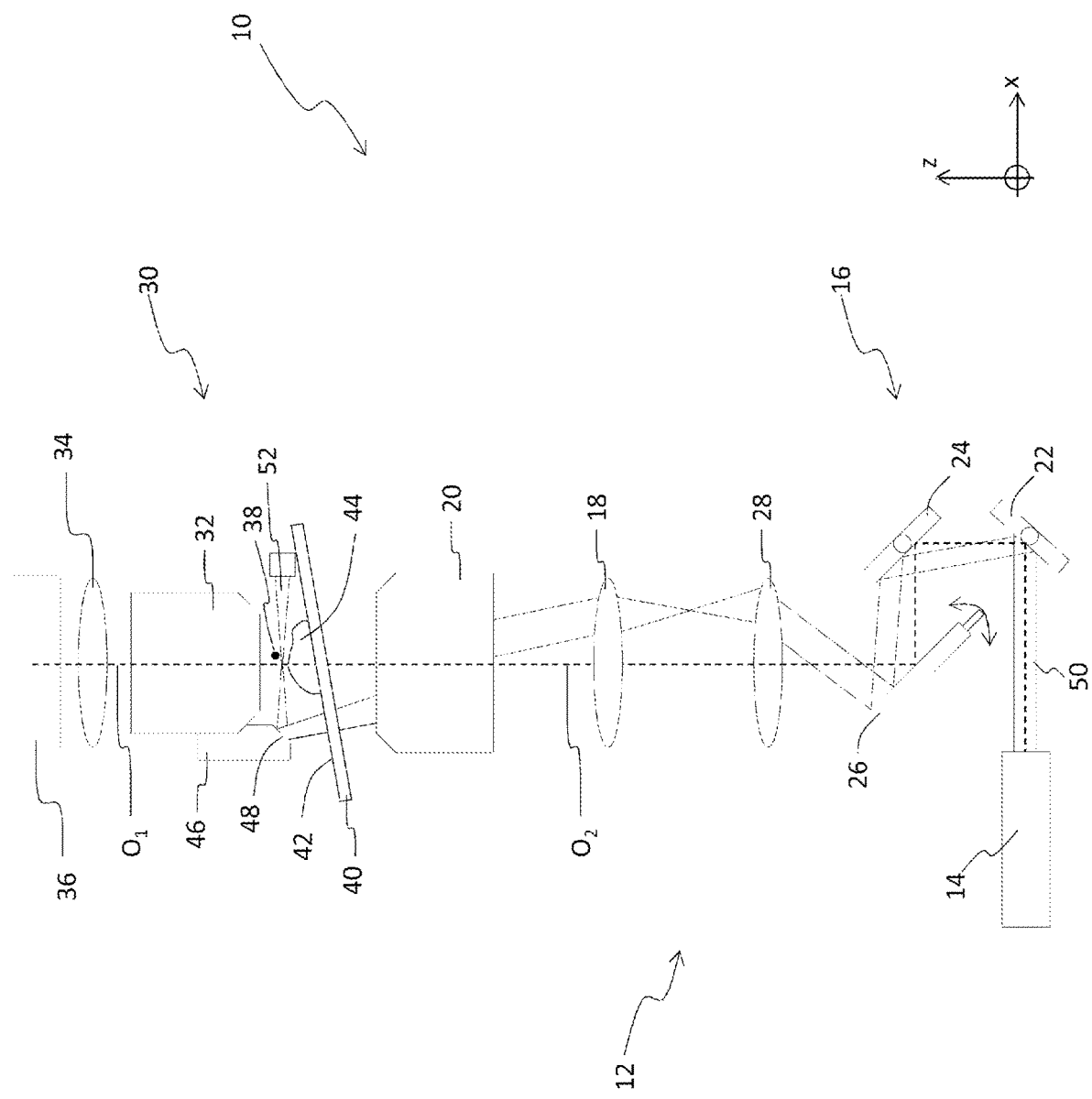
FIG. 1 shows a schematic illustration of a lightsheet microscope according to the invention.

Embodiments of the invention improve a lightsheet microscope of the type described at the outset in such a way that it enables high-resolution imaging with simple sample preparation.

An embodiment of the invention achieves this improvement by way of a lightsheet microscope, comprising a detection objective for imaging a target region of a sample, which is located in a focal plane of the detection objective, an illumination objective for focusing an illumination light beam in the sample, wherein the detection objective and the illumination objective are opposite to one another with the optical axes thereof aligned perpendicularly in relation to the focal plane and define a sample chamber containing the focal plane between them, a sample holder having at least one carrier surface arranged in the sample chamber, onto which the sample is applicable, and a light deflection device having a deflection surface, which is arranged laterally offset in relation to the optical axis of the detection objective in the sample chamber and is designed to deflect the—preferably focused—illumination light beam through the illumination objective in a direction perpendicular to the optical axis of the detection objective in such a way that the deflected illumination light beam forms a lightsheet-type illumination light distribution focused in the focal plane, wherein the light deflection device has a collision section facing toward the carrier surface, which defines a mechanical stop on the light deflection device for the carrier surface, which prevents a coplanar arrangement of the carrier surface in the focal plane. According to the invention, the carrier surface is inclined to the focal plane at a predetermined angle of inclination in such a way that a part of the carrier surface is arranged in the focal plane.

An embodiment of the invention thus provides tilting the carrier surface of the sample holder in relation to the focal plane of the illumination objective and/or the detection objective, which is coincident with the illumination plane formed by the lightsheet-type illumination light distribution, in order to position a part of the carrier surface supporting the sample in the focal plane of the illumination objective and/or the detection objective. It is thus possible to prepare and/or arrange the sample without pedestal directly on the carrier surface of the sample holder. This substantially facilitates the work with the lightsheet microscope, in particular if the microscope is used at the same time as a wide-field microscope and/or as a confocal microscope, wherein typically a sample preparation takes place directly on the carrier surface or a slide or a cover glass and without a pedestal in any case.

The light deflection device according to an embodiment of the invention is implemented, for example, in the form of a single mirror element, which is arranged laterally offset in relation to the optical axis of the detection objective and thus laterally offset in relation to the target region of the sample to be imaged by the detection objective. In this case, the light deflection device can also be embodied in such a way that it comprises multiple mirror facets, to be able to vary the illumination direction within the illumination plane and thus the focal plane as desired, for example, to illuminate the sample from slightly different directions.

One advantage of an embodiment of the invention is that the sample illumination according to an embodiment of the invention may be implemented without the aid of a sample pedestal in a simple manner even on already existing microscope systems. Only an inclined carrier surface and a correspondingly designed light deflection device, which can be easily retrofitted, are required for this purpose.

The carrier surface of the sample holder is preferably formed at least partially transparent, wherein the illumination objective orients the illumination light beam through the transparent part of the carrier surface onto the deflection surface. In particular, it is possible to embody the sample holder, neglecting the inclination of its carrier surface, like a conventional cover glass, i.e., as transparent in its entirety. Due to the at least partial transparent formation of the carrier surface, it is possible to guide the illumination light beam exiting from the illumination objective adjacent to the sample located on the carrier surface through the sample holder onto the deflection surface of the light deflection device, to then deflect it from the side perpendicularly onto the optical axis of the detection objective in its focal plane to generate the lightsheet.

Alternatively or additionally, the carrier surface—possibly in cooperation with an immersion medium and/or a sample medium—is designed in such a way that the smallest possible part of the illumination light beam is reflected on the carrier surface. This is in particular intended so that after the illumination light beam has run through the carrier surface and has been deflected on the deflection surface, it is incident on the carrier surface again. This could be achieved in that the carrier surface is coated, for example, using an antireflective coating, which is provided and/or optimized for the wavelengths used of the illumination light. The use of immersion medium and/or a sample medium having an index of refraction which is substantially adapted to the index of refraction of the sample holder (or vice versa, a sample holder, the index of refraction of which is adapted to the sample and the immersion medium), can also reduce the reflection components of the illumination light beam.

In one preferred embodiment, the illumination objective is designed to orient the illumination light beam—upon a first incidence of the illumination light beam on the sample holder and/or on the carrier surface—in the perpendicular direction of incidence onto the transparent part of the carrier surface. This embodiment takes into consideration the circumstance that aberrations occur if the illumination light beam passes diagonally through the carrier surface of the sample holder. These are also amplified if a sample medium between the detection objective and the carrier surface has a different index of refraction than a medium provided between the carrier surface and the illumination objective. Such aberrations can be reduced or avoided by the perpendicular incidence of light on the carrier surface provided in this embodiment.

The sample holder is designed, for example, as a microscope table insert, which is adapted in its dimensions or is substantially identical to other inserts provided for an existing microscope table and is thus easily replaceable. Such an insert comprises one or more transparent, inclined carrier sections on its bottom, for example, on which the samples can be arranged. It is also possible to embody only a part of the respective carrier section as transparent and to guide the illumination light beam through this transparent part onto the deflection surface. The remaining part of the carrier section, in particular the part on which the sample is located, can then be formed opaque and can be provided, for example, with markings or shaped elements, for example, to position the sample in the correct location, mechanically guide it, and/or prevent slipping of the sample on the inclined carrier surface. The carrier surface is preferably provided with calibrating and/or coding markings in conjunction with the sample holder and/or the microscope table, so that a control unit of the lightsheet microscope knows the relative position of the carrier surface in relation to the illumination objective and/or the detection objective and can compute or knows the present height of the cover glass therefrom. The control unit thus, on the one hand, knows the position of the sample and, on the other hand, a collision between deflection mirror and carrier surface (and/or the illumination objective or the detection objective) can be avoided.

The light deflection device is preferably attached to a part of the detection objective facing toward the sample. The light deflection device is thus, for example, embodied in the form of a so-called mirror cap, which may be attached to the detection objective and detached therefrom like mirror caps known from the prior art. In contrast to conventional mirror caps, which comprise two mirror elements laterally offset in relation to the optical axis of the detection objective, however, in this refinement the mirror cap only has one single mirror element, to enable a certain inclination of the carrier surface without stopping on the mirror cap.

The illumination objective and the deflection surface preferably cooperate in such a way that the lightsheet-type illumination light distribution formed by the focused illumination light beam in the focal plane has its minimal axial extension on the optical axis of the detection objective. The less the mentioned axial extension of the lightsheet along the optical axis of the detection objective is, the higher is the resolution achievable in the imaging.

The predetermined angle of inclination, at which the carrier surface of the sample holder is inclined in relation to the focal plane, is preferably within an angle range which extends from a lower limiting angle, at which the carrier surface of the sample holder is stopped with the collision section of the light deflection device, up to an upper limiting angle. The upper limiting angle is also established, for example, by stopping of the carrier surface on the light deflection device.

The vertex of the angle of inclination at which the carrier surface intersects the focal plane is preferably located on an edge of an image field facing toward the deflection surface, which defines the target region imaged by the detection objective. The vertex can be identified accordingly in the above-mentioned calibration and/or coding markings of the carrier surface and/or the sample holder, so that the position of the vertex is known or can be made known to the control unit of the lightsheet microscope.

The extension of the deflection surface is preferably dimensioned in such a way that the projection of the deflection surface on the optical axis of the detection objective is substantially equal to the beam cross section or the beam diameter, which the illumination light beam has in the mentioned projection on the deflection surface. It is thus ensured that the axial extension of the deflection surface on the beam cross section of the illumination light beam is restricted before deflection on the deflection surface, whereby the angle of inclination at which the carrier surface of the sample holder is inclined in relation to the focal plane can be kept comparatively small.

In one preferred embodiment, the lightsheet microscope contains an illumination unit upstream of the illumination objective having a light source and a lightsheet generator, which is designed to generate the lightsheet-type illumination light distribution from the illumination light beam generated by the light source in cooperation with the illumination objective.

In one particularly preferred embodiment, the lightsheet generator comprises a scanning unit. This scanning unit is designed to deflect the illumination light beam generated by the light source in such a way that it executes a scanning movement in the focal plane of the detection objective, by which the lightsheet is built up. For this purpose, the scanning unit comprises one or more scanning mirrors, which deflect the illumination light beam in the desired manner. For example, a confocal scanner having three scanning mirrors can be used as the scanning unit, of which a first and a second scanning mirror ensure, for example, tilting of the illumination light beam in the x direction and a third scanning mirror ensures a tilt in the y direction. In this case, the first and the second x scanning mirror are used to tilt the illumination light beam around a point which is located on the y scanning mirror. The second x scanning mirror thus partially compensates for the tilting by the first x scanning mirror, so that the illumination light beam remains at a fixed position, typically on the optical axis, on the third scanning mirror, which tilts in the y direction. In the scope of an embodiment of the present invention, the mirrors can also cooperate so that the illumination beam is both offset along the x direction and also tilted around the y direction and upon a first incidence of the illumination beam on the carrier surface and/or the sample holder, is incident perpendicularly on the carrier surface tilted in relation to the optical axis of the illumination objective.

In one preferred embodiment, the optical axis of the illumination objective is laterally offset in relation to the optical axis of the detection objective. It is thus possible, for example, to laterally displace the illumination objective by means of a suitable adapter in an objective revolver.

The above-mentioned lateral offset of the illumination objective takes into consideration the circumstance that without such an offset, the enlargement of the illumination objective has to be comparatively small to ensure that the illumination objective is incident on the laterally offset deflection surface with the illumination light beam. In contrast, if one enables a lateral offset for the illumination objective, the requirements for the enlargement of the illumination objective can thus be significantly reduced. The fact that, in the case of a laterally offset illumination objective, its entry pupil cannot be fully illuminated using the illumination beam is not problematic in the preferred application, since preferably backlighting of the entry pupil takes place, so that the desired tilt of the illumination light beam in relation to the optical axis of the illumination objective occurs.

Accordingly, the lightsheet generator is preferably designed so as to orient the illumination light beam onto a partial region of an entry pupil of the illumination objective, which is laterally offset in relation to the optical axis of the illumination objective out of the center of the entry pupil.

Furthermore, the lightsheet generator is preferably designed to orient the illumination light beam tilted in relation to the optical axis of the illumination objective onto the mentioned partial region.

In one advantageous embodiment, the carrier surface is movable along an axis to displace the focal plane inside the sample, wherein the mentioned axis can be defined by the optical axis of the detection objective, by an axis perpendicular to the optical axis of the detection objective, or by an axis perpendicular to the carrier surface. It is particularly preferable in this case to displace the carrier surface along an axis which is perpendicular to the carrier surface. This displacement movement can be achieved by a superposition of an axial displacement and a lateral displacement. It results in image volumes which have a trapezoidal cross section. A further advantage of the displacement of the carrier surface along the propagation direction of the illumination light beam is that the illumination light beam is always incident on the same point of the deflection surface. This also applies if the carrier surface is moved perpendicularly in relation to the propagation direction of the illumination light beam.

The above-mentioned improvement is furthermore achieved by a retrofitting kit for a lightsheet microscope, which comprises a sample holder insert and a light deflection device. The sample holder insert and the light deflection device are designed in this case according to the above embodiments and can be retrofitted into a microscope or into a lightsheet microscope in such a way that the carrier surface is inclined in relation to the focal plane at a predetermined angle of inclination in such a way that a part of the carrier surface is arranged in the focal plane of the detection objective (and/or the illumination objective). The retrofitting kit according to embodiments of the invention is finally suitable for the purpose of configuring an existing conventional microscope or lightsheet microscope to form a lightsheet microscope according to embodiments of the invention. A person skilled in the art active in the present field is capable of designing such a retrofitting kit accordingly in awareness of the statements made above, such that reference is made to the preceding part of the description to avoid repetitions.

FIG. 1 shows a lightsheet microscope 10, which represents an exemplary embodiment of the present invention.

The lightsheet microscope 10 contains an illumination unit 12, which comprises a light source 14, a scanning unit 16, a tube lens 18, and an illumination objective 20. The scanning unit 16 is formed from three scanning mirrors 22, 24, and 26, and a scanning lens 28.

The lightsheet microscope 10 furthermore contains a detection unit 30, which comprises a detection objective 32, an ocular 34, and a camera 36.

A sample chamber 38, in which a sample holder 40 is located, is defined between the detection objective 32 and the illumination objective 20, which are arranged having the optical axis $O_1$ and $O_2$ thereof coaxially opposite to one another. The sample holder 40, which is embodied, for example, as a plane-parallel transparent plate, has a carrier surface 42 facing toward the detection objective 32, on which a sample 44 to be imaged is arranged.

The lightsheet microscope 10 furthermore comprises a light deflection device 46, embodied, for example, as a mirror cap, which is attached to the detection objective 32 in such a way that its deflection surface 48, which is designed in the form of a mirror, is offset laterally in relation to the optical axis $O_1$ of the detection objective 32. The light deflection device 46 is used for deflecting an illumination light beam 50, which the illumination unit 16 radiates into the sample chamber 38 in the manner described hereafter.

The illumination light beam 50 generated by the light source 14 is firstly supplied to the scanning unit 16. In the exemplary embodiment according to FIG. 1, the scanning unit 16 forms a confocal scanner, which is formed from the three scanning mirrors 22, 24, and 26. The two scanning mirrors 22 and 24 are used in this case to deflect the illumination light beam 50 in a first direction, which is parallel to the x axis with reference to the coordinate system according to FIG. 1. In contrast, the scanning mirror 26 downstream of the two x scanning mirrors 22, 24 in the direction of light propagation deflects the illumination light beam 50 in a direction which is parallel to the y axis. The three scanning mirrors 22, 24, and 26 cooperate in such a way that the two x scanning mirrors 22, 24 tilt the illumination light beam 50 around a point which is located on the y scanning mirror 26. In this manner, the second x scanning mirror 24 compensates to a certain extent for the tilt of the illumination light beam 50 caused by the first x scanning mirror 22, so that said beam remains at a fixed position on the y scanning mirror 26, which is tilted in the y direction (perpendicular to the plane of the drawing). This position is not necessarily on the optical axis $O_2$.

The y scanning mirror 26 deflects the illumination light beam 50 onto the scanning lens 28, which orients the illumination light beam 50 onto the tube lens 18. In this exemplary embodiment, the illumination light beam 50 does not completely illuminate the entry pupil of the illumination objective 20 upon entry into the latter. Moreover, the illumination light beam 50 is laterally offset in relation to the optical axis $O_2$ of the illumination objective 20 and is tilted in relation to the optical axis $O_2$ in the entry pupil of the illumination objective 20.

The illumination light beam 50 incident as a parallel beam bundle in the illumination objective 20 is focused by the latter and is oriented onto the deflection surface 48 of the light deflection device 46. The deflection surface 48 arranged laterally to the optical axis $O_1$ of the detection objective 32 then deflects the illumination light beam 50 inward into the sample chamber 38 essentially perpendicularly to the optical axis $O_1$. Due to the focusing action of the illumination objective 20, a lightsheet-type illumination light distribution 52, which is also simply referred to as a lightsheet hereafter, located perpendicularly to the optical axis $O_1$ of the detection objective 32—in particular in cooperation with the scanning mirrors 22, 24—is thus generated inside the sample chamber 38. The lightsheet 52 defines an illumination plane, which is coincident with the focal plane of the detection objective 32. A target region of the sample 44 illuminated using the lightsheet 52 is thus sharply imaged on the camera 36 by the detection objective 32. In this context, it is to be noted that for reasons of more comprehensible illustration, the lightsheet 52 is located outside the sample 44 in FIG. 1. However, it is self-evident that the lightsheet 52 is focused into the sample 44 in the actual imaging in order to illuminate the target region to be imaged.

As FIG. 1 shows, the sample holder 40 is positioned in the lightsheet microscope 10 so that its carrier surface 42 is inclined in relation to the illumination plane and thus the focal plane of the detection objective 32. This inclination of the carrier surface 42 represents an essential aspect of an embodiment of the present invention. To explain this aspect, reference is firstly made to the schematic illustration according to FIG. 2, however, which illustrates the horizontal alignment of the carrier surface 42 heretofore typical in the prior art and the disadvantages accompanying this.

Figure 2:
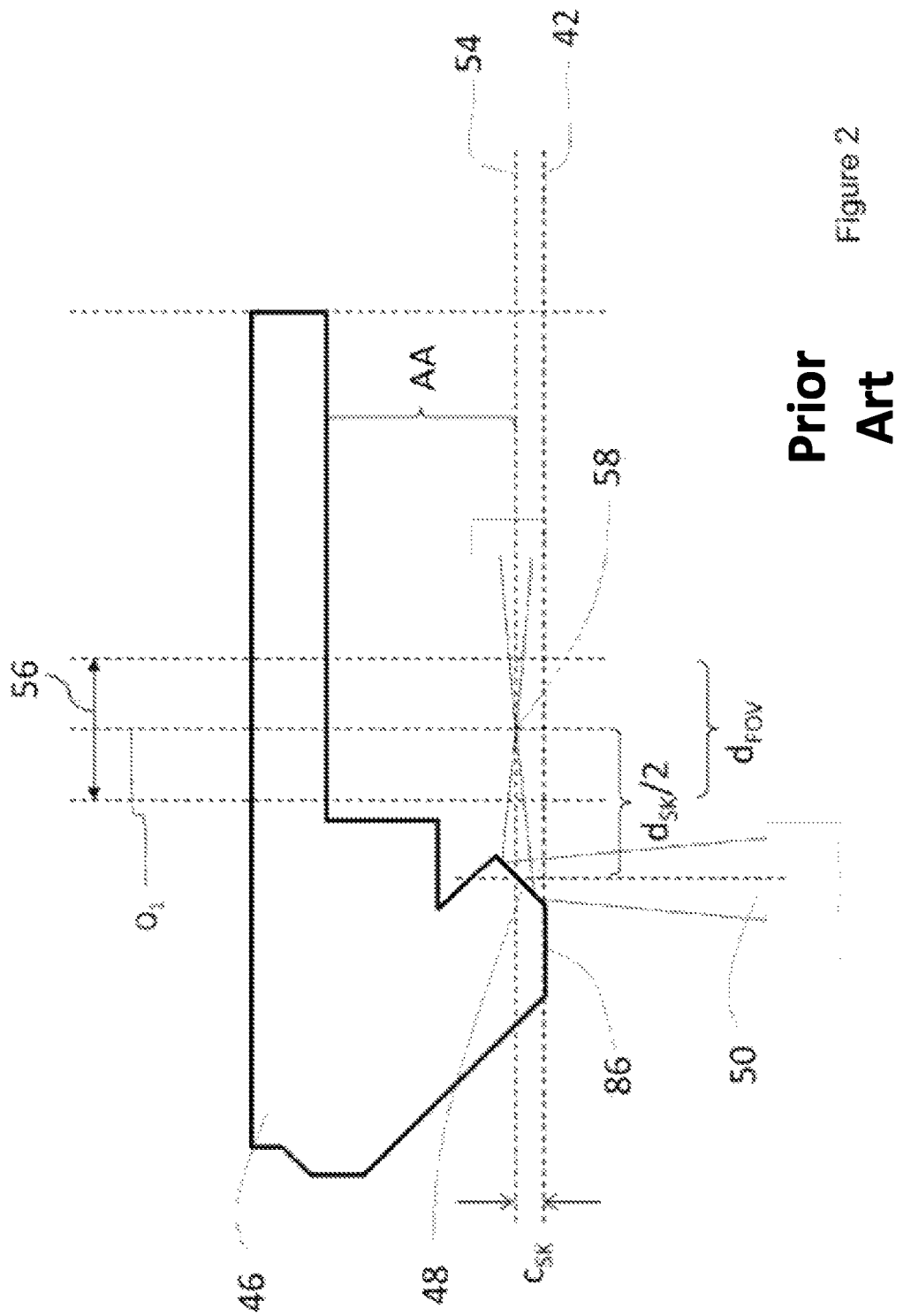
FIG. 2 shows a light deflection device in cooperation with a carrier surface of the sample holder aligned horizontally in a conventional manner.

FIG. 2 shows the light deflection device 46 having its mirror surface 48, which is laterally offset in relation to the optical axis $O_1$ of the detection objective 32 (not shown in FIG. 2). The mirror cap 46 has an end face 86, which faces toward the carrier surface 42 of the sample holder 40, shown solely schematically as a dashed line in FIG. 2. The end face 86 forms a stop for the carrier surface 42, which, with horizontal alignment of the carrier surface 42, prevents a coplanar positioning of the carrier surface 42 in the focal plane 54 of the detection objective 32.

Furthermore, an image field 56 is shown in FIG. 2, which has a width $d_{FOV}$ perpendicularly to the optical axis $O_1$ of the detection objective 32. The target region of the sample identified by 58 in FIG. 1 is located within the image field 56, which target region is located in the focal plane 54 and is thus imaged by the detection objective 32 on the camera 36 shown in FIG. 1. The distance which the laterally offset deflection mirror 48 has from the center of the image field 56 located on the optical axis $O_1$ is identified by $d_{SK/2}$ in FIG. 2. In addition, in FIG. 2, the dimension AA indicates the operating distance of the detection objective 32 from the focal plane 54.

Since the deflection mirror 48 has the function of reflecting the illumination light beam 50 as much as possible without light loss in the direction of the center of the image field 56, its axial extension, i.e., its extension in projection on the optical axis $O_1$ of the detection objective 32, cannot be smaller than the beam cross section which the illumination light beam 50 has at the location of the deflection mirror 48. Since the illumination light beam 50 is now focused into the center of the image field 56, however, the beam cross section of the illumination light beam 50 at the deflection mirror 48 is significantly larger than in the center of the image field 56. This has the result that the illumination plane, which is defined by the focused illumination light beam 50 and is coincident with the focal plane 54, is offset along the optical axis $O_1$ of the detection objective 32 in relation to the horizontal end face 86 of the light deflection device 46 (upward in FIG. 2). Since the end face 86 of the light deflection device 46 defines the closest approach of the carrier surface 42 to the focal plane 54, in this way an axial offset occurs between the carrier surface 42 and the focal plane 54, which is identified in FIG. 2 by $c_{SK}$. In the prior art, the offset $c_{SK}$ is compensated for in the scope of the sample preparation with the aid of a pedestal arranged on the carrier surface 42, the height of which in the direction of the optical axis $O_1$ just corresponds to the axial offset $c_{SK}$.

Figure 3:
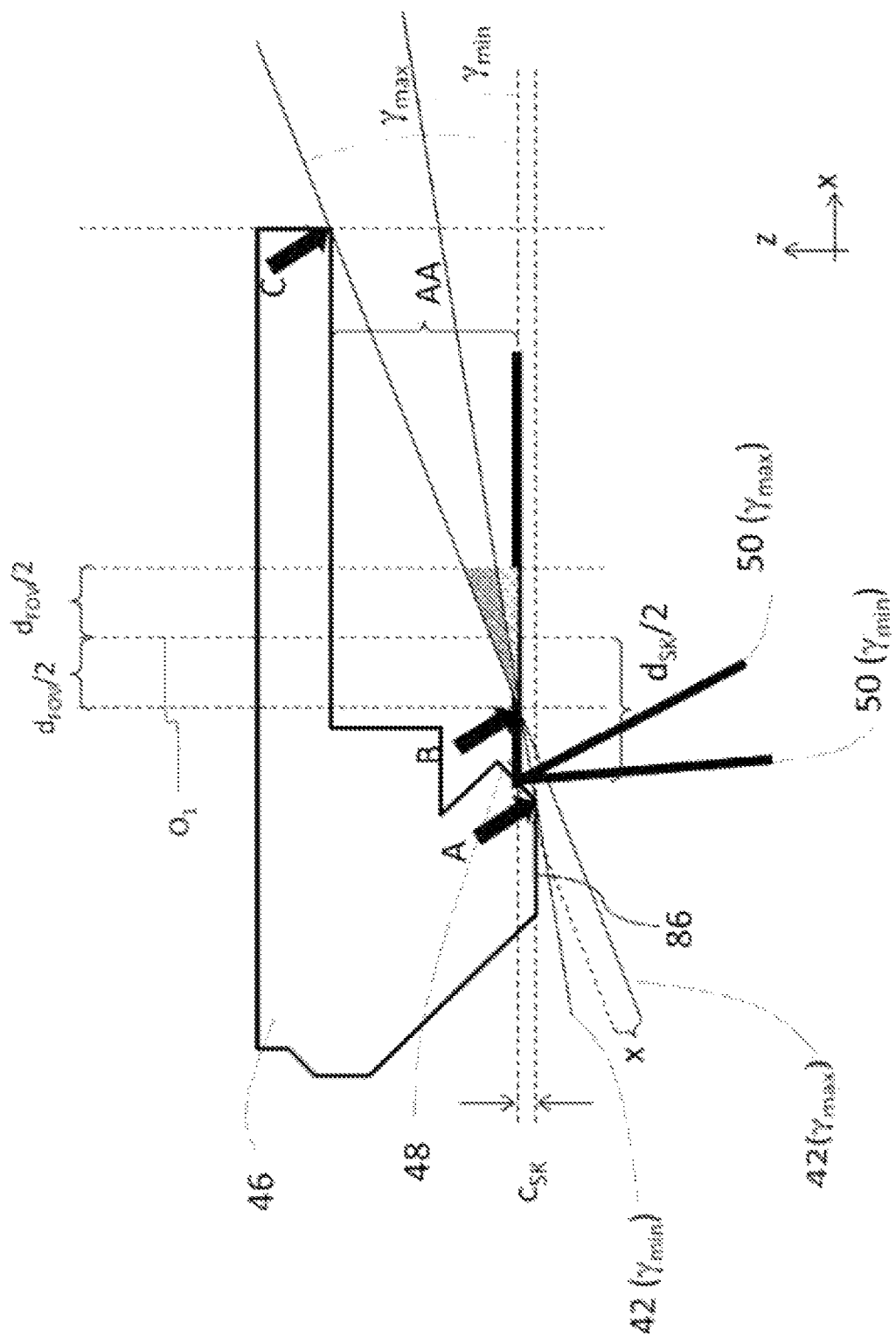
FIG. 3 shows an illustration corresponding to FIG. 2 having the inclined carrier surface of the sample holder according to the invention.

The schematic illustration according to FIG. 3 illustrates how a pedestal-free sample preparation is enabled by the inclination according to an embodiment of the invention of the carrier surface 42 with an arrangement otherwise identical to FIG. 2.

As shown in FIG. 3, the carrier surface 42 is tilted in relation to the focal plane 54 by an angle of inclination, which is within an angle range which extends from a lower limiting angle $\gamma_{min}$ up to an upper limiting angle $\gamma_{max}$. The mentioned angle of inclination with respect to the focal plane 54 is related in this case to a vertex B, which is defined by the point of intersection between the carrier surface 42 and the focal plane 54. The minimal angle of inclination $\gamma_{min}$ is established by a stop of the carrier surface 42 identified by A in FIG. 2 on the end face 86 of the light deflection device 46. In contrast, the maximal angle of inclination $\gamma_{max}$ is established by a stop of the carrier surface 42 identified by C in FIG. 3 on a section of the light deflection device 46, which is located on the side of the light deflection device 46 facing away from the deflection mirror 48. This means that the carrier surface 42 can be tilted and/or arranged in relation to the optical axis $O_1$ of the detection objective 32 within an angle range which is restricted by the two mechanical stops A and C on the light deflection device 46.

It is immediately clear from the illustration of FIG. 3, in particular upon viewing the stop C, that the light deflection device 46 according to an embodiment of the invention only comprises a single deflection element, namely the deflection mirror 48 arranged on the left of the optical axis $O_1$ in FIG. 3. It is only thus possible to move the stop C located on the other side of the optical axis $O_1$ far enough away from the focal plane 54 that a sufficient maximal angle of inclination $\gamma_{max}$ can be provided. It is moreover indicated in FIG. 3 that the illumination light beam 50 is preferably inclined in relation to the optical axis $O_1$ in such a way that it is incident perpendicularly on the inclined carrier surface 42. Accordingly, the illumination light beam 50 is shown in FIG. 3 in two different directions of incidence, of which one is in relation to the minimal angle of inclination $\gamma_{min}$ and the other to the maximal angle of inclination $\gamma_{max}$. This tilt of the illumination light beam 50 is used to avoid aberrations, which always occur in the case of an otherwise inclined incidence of the illumination light beam 50 on the carrier surface 42, in particular if the medium between the detection objective 32 and the carrier surface 42 has an index of refraction which is different from the index of refraction of the medium located between the carrier surface 42 and the illumination objective 20.

In order that the illumination light beam 50, as explained above, is inclined in relation to the optical axis $O_1$ of the detection objective to avoid aberrations in such a way that it is incident perpendicularly on the carrier surface 42, the deflection mirror 48 thus has to be tilted accordingly to ensure that the illumination light beam 50 reflected on the deflection mirror 48 is radiated perpendicularly to the optical axis $O_1$ in the direction of the image field 56. This is illustrated in FIGS. 4 and 5.

Figure 4:
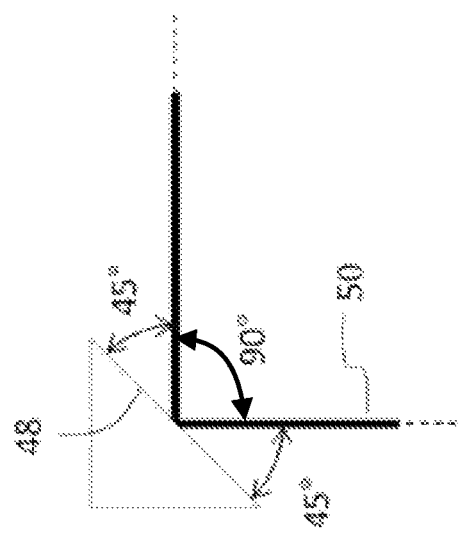
FIG. 4 shows a schematic illustration of the carrier surface in a typical 45° arrangement.

FIG. 4 shows, solely schematically, the alignment of the deflection mirror 48 in a conventional arrangement, in which the illumination light beam 50 is incident on the deflection mirror 48 in parallel to the optical axis $O_1$. In this arrangement, the deflection mirror 48 is inclined by 45° in relation to the optical axis $O_1$.

Figure 5:
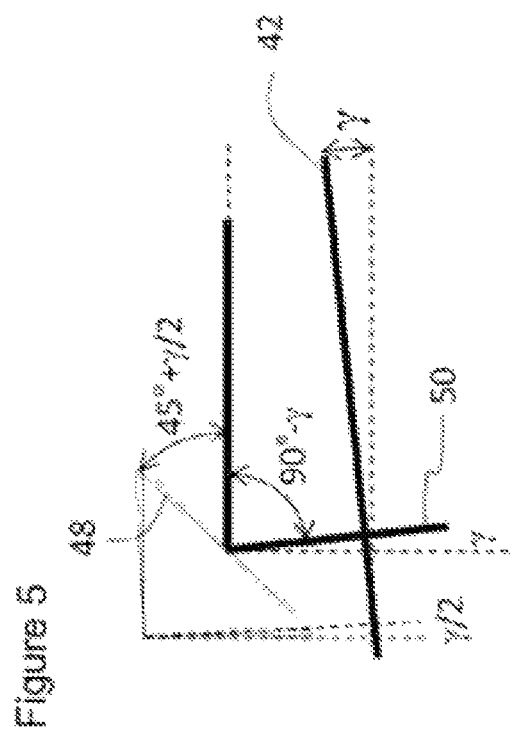
FIG. 5 shows an illustration corresponding to FIG. 4 having the carrier surface tilted according to the invention.

In contrast, FIG. 5 shows an arrangement corresponding to FIG. 3, in which the illumination light beam 50 is inclined by the angle $\gamma$, which is equal to the angle of inclination of the carrier surface 42, in relation to the optical axis $O_1$. This beam inclination by the angle $\gamma$ has the result that the deflection mirror 48 is inclined by the angle $\gamma/2$ in relation to the typical 45° alignment.

Certain requirements for the illumination objective 20 to be used are visualized solely by way of example hereafter for the variables specified in FIG. 3.

The minimal angle of inclination $\gamma_{min}$ results from:

$$\sin \gamma_{min} = c_{SK}/((d_{SK} - d_{FOV})/2)$$

If one assumes by way of example the value 500 μm for $c_{SK}$, the value 330 μm for $d_{FOV}$, and the value 6 mm for $d_{SK}$, the value 9.1° thus results for $\gamma_{min}$. In contrast, if $d_{SK}$ is 3.5 mm, for example, a value of 15.1° thus results for $\gamma_{min}$.

The following conditions result therefrom for the numeric aperture $NA_{IO}$ and the operating distance AA of the illumination objective:

$$NA_{IO} > \sin(\gamma + \alpha_{ill})$$

at $\gamma = \gamma_{min} = 9.1°$, $\alpha_{ill} = \arcsin(0.15/1.33) = 6.5°$ is $NA_{IO} > 0;27$ at $\gamma = \gamma_{min} = 15.1°$, $\alpha_{ill} = \arcsin(0.15/1.33) = 6.5°$ is $NA_{IO} > 0;37$ $$AA > d_{SK}/2 + x \text{ where } x = d_{SK}/2 \sin \gamma$$

at $d_{SK} \approx 6$ mm, $\gamma = \gamma_{min} = 9.1°$ is $x = 0.47$ mm → $AA > 3$ mm + 0.47 mm ≈ 3.5 mm at $d_{SK} 3.5$ mm, $\gamma_{min} = 15.1°$ is $x = 0.46$ mm → $AA > 1.75$ mm + 0.46 mm = 2.25 mm Suitable illumination objectives accordingly have a relatively large free operating distance and can have a numeric aperture of up to 0.4 or greater.

Moreover, the illumination objective 20 is to have a comparatively low enlargement, so that it is ensured that the illumination light beam 50 exiting from the illumination objective 20 is incident on the deflection mirror 48 of the light deflection device 46. If one again assumes solely by way of example that the field-of-view number of the confocal scanner or the scanning unit 16, respectively (cf. FIG. 1), is approximately 20 mm, the illumination beam can only be incident on mirrors at a distance of $d_{sk} = 8$ mm or more if the illumination objective 20 has an enlargement of at most 2.5. Illumination objectives having an enlargement of approximately 2.5 typically only have very small numeric apertures of, for example, 0.07. On the other hand, objectives having higher apertures of 0.3 typically also have higher enlargements and can therefore only be incident on light deflection devices at a given field-of-view number of the confocal scanner which are at a lesser distance $d_{sk}$ in relation to one another. It is therefore provided in the present case to displace the illumination objective 20 laterally in relation to the optical axis $O_1$ of the detection objective 32, for example, by means of a suitable adapter, in order to reduce the requirement for the objective enlargement. A corresponding embodiment is shown solely schematically in FIG. 6.

Figure 6:
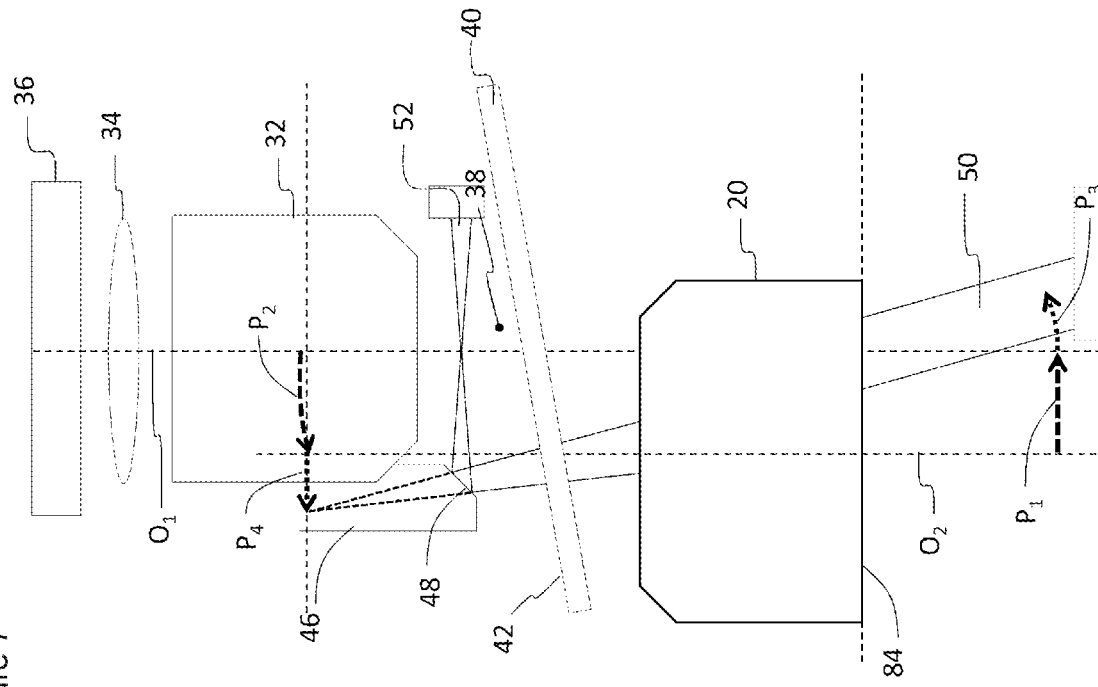
FIG. 6 shows a schematic illustration to visualize how a lateral offset of the illumination light beam in the objective pupil results in a tilt of the illumination light beam in the focal plane.

In the arrangement according to FIG. 6, the optical axis $O_2$ of the illumination objective 20 is laterally offset in relation to the optical axis $O_1$ of the detection objective 32. The illumination light beam 50 backlighting an entry pupil 84 of the illumination objective 20 thus has a lateral offset in relation to the optical axis $O_2$, which is indicated in FIG. 6 by the arrow P1. This lateral offset in the entry pupil 84, which is located in the rear focal plane of the illumination objective 20, results in a tilt of the illumination light beam 50 in the image plane and thus the focal plane of the detection objective 32. This beam tilt is indicated by the arrow P2 in FIG. 6. The tilt of the illumination light beam 50 is set in particular so that the illumination light beam 50 is incident perpendicularly on the sample holder 40.

Figure 7:
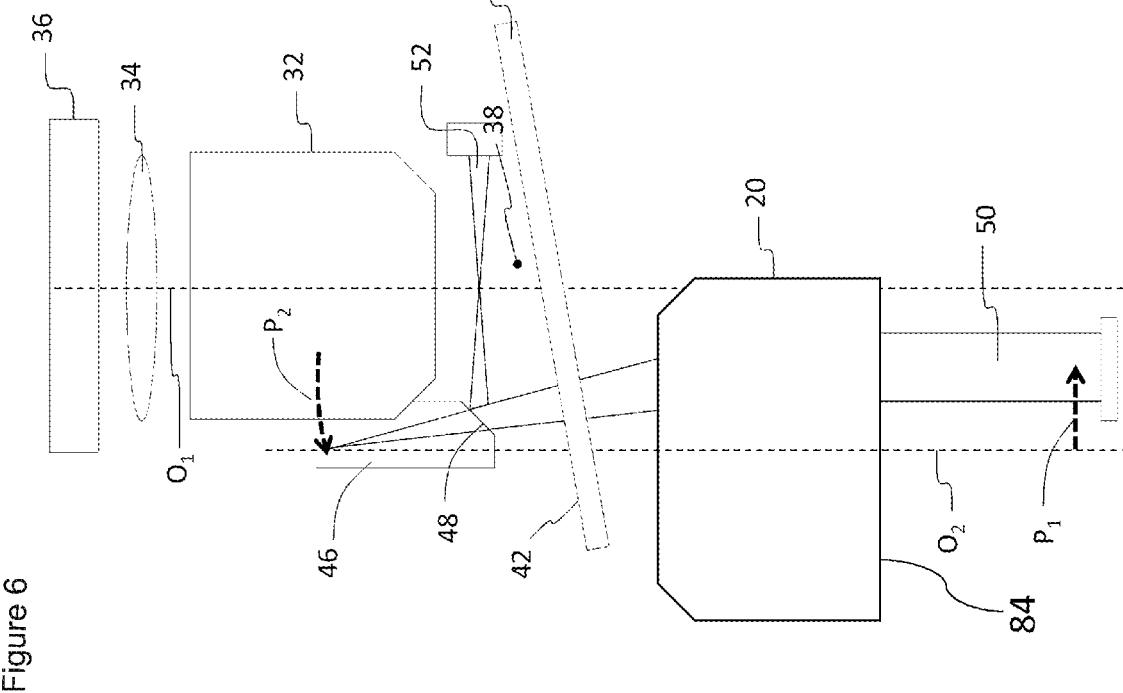
FIG. 7 shows a schematic illustration to visualize how a tilt of the illumination light beam in the objective pupil results in a lateral offset of the illumination light beam in the focal plane.

To ensure that the illumination light beam 50 is incident on the deflection mirror 48 of the light deflection device 46, which is typically at the edge of the image field 56 according to the illustration according to FIG. 3, it is favorable to additionally tilt the illumination light beam 50 in the entry pupil of the illumination objective 20. This additional beam tilt in the objective pupil is illustrated in FIG. 7 by an arrow P3. It results in the focal plane in a lateral offset of the illumination light beam 50, which is indicated in FIG. 7 by an arrow P4.

Figure 8:
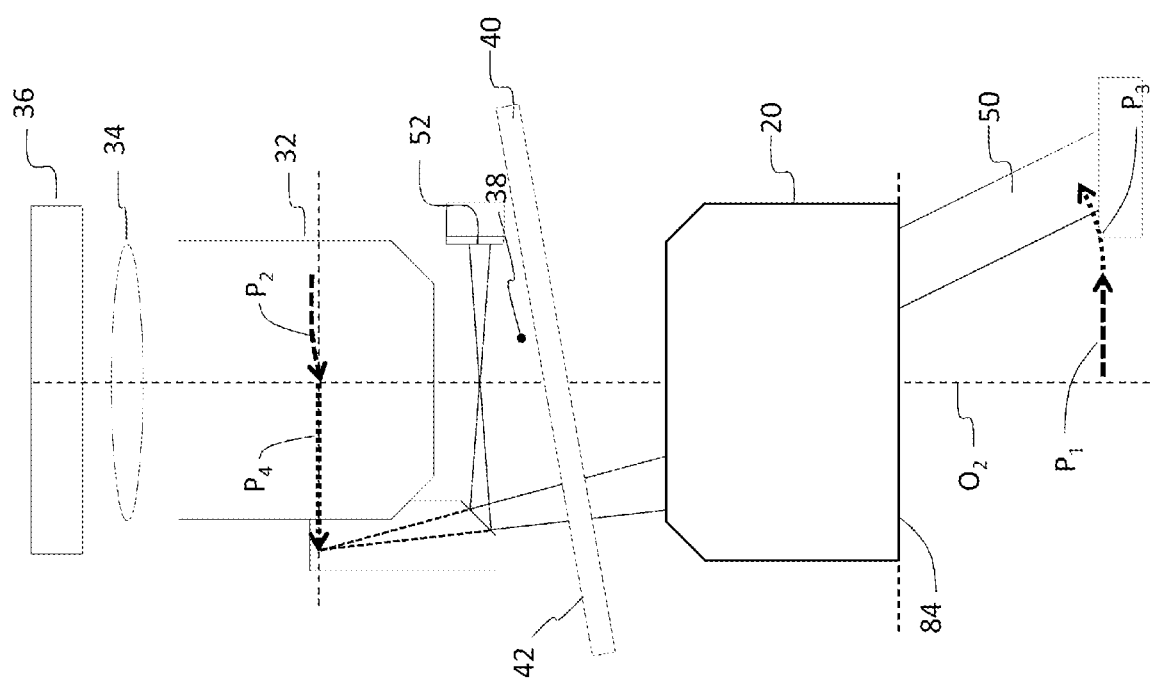
FIG. 8 shows an illustration corresponding to FIG. 7, wherein the illumination objective and the detection objective are aligned coaxially in relation to one another.

The tilt having offset of the illumination light beam 50 illustrated in FIG. 7 is not linked to the offset of the optical axis $O_2$ in relation to $O_1$, of course. Whether the illumination objective 20 has to be offset in relation to the detection objective 32 is, as described above, decisively determined in that the deflection surface 48 has to be located in the image field of the illumination objective 20 in conjunction with the scanning unit 16. An alternative arrangement is shown in FIG. 8, which manages without lateral offset of the illumination objective 20 in relation to the detection objective 32. This is achieved in that the beam offset indicated by the arrow P1 and the beam tilt indicated by the arrow P3 in the objective pupil 84 are accordingly selected as greater than in the arrangement according to FIG. 7. The arrangement shown in FIG. 8 thus corresponds to the embodiment according to FIG. 1, wherein the scanning unit 16 shown therein, which is formed from the three scanning mirrors 22, 24, and 26, ensures that the illumination light beam 50 according to FIG. 8 is laterally offset and tilted in the desired manner in the entry pupil or the objective pupil 84 of the illumination objective 20.

Figure 9:
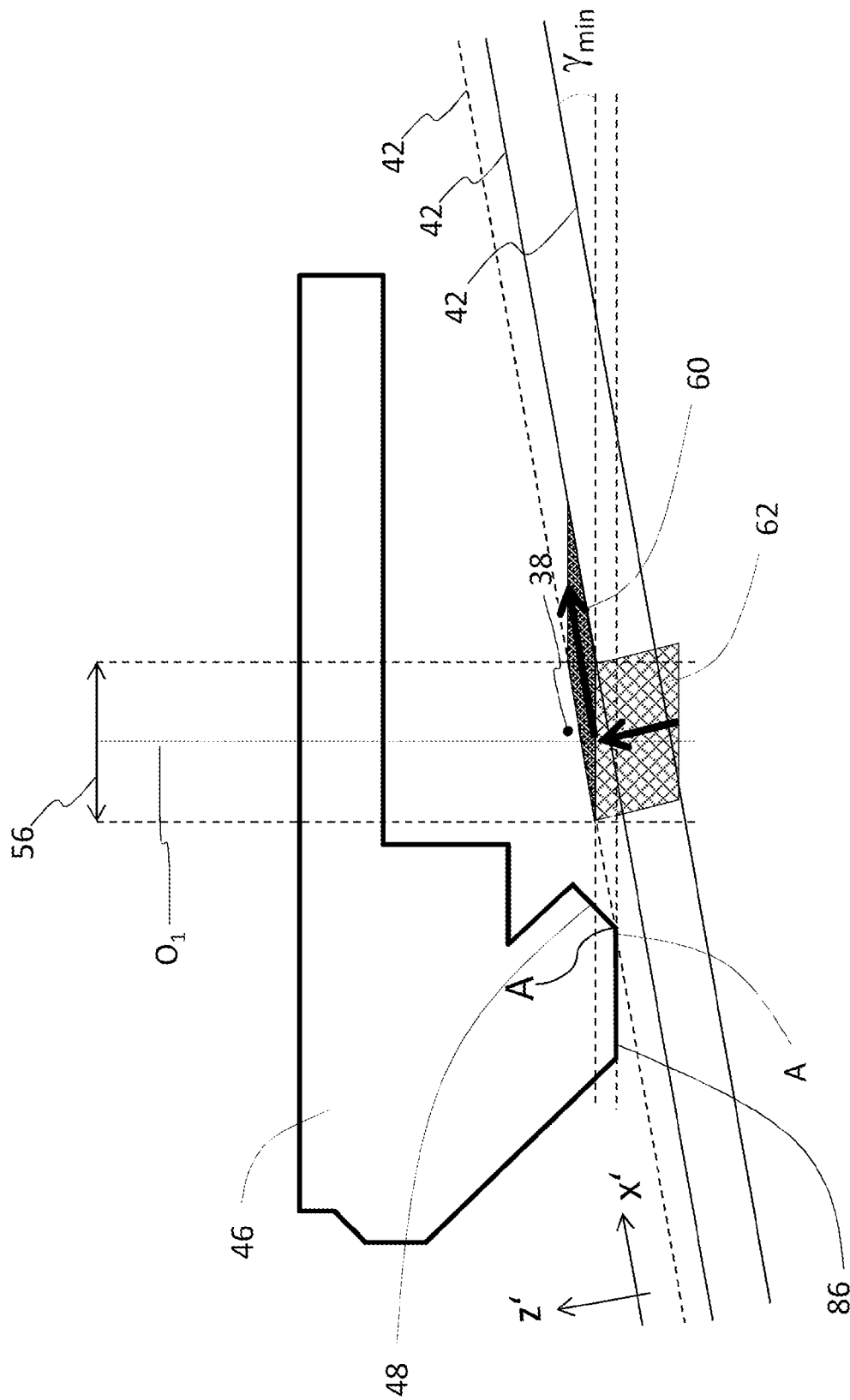
FIG. 9 shows a schematic illustration to visualize the image volumes which are generated by displacing the carrier surface arranged at a minimal angle of inclination.
Figure 10:
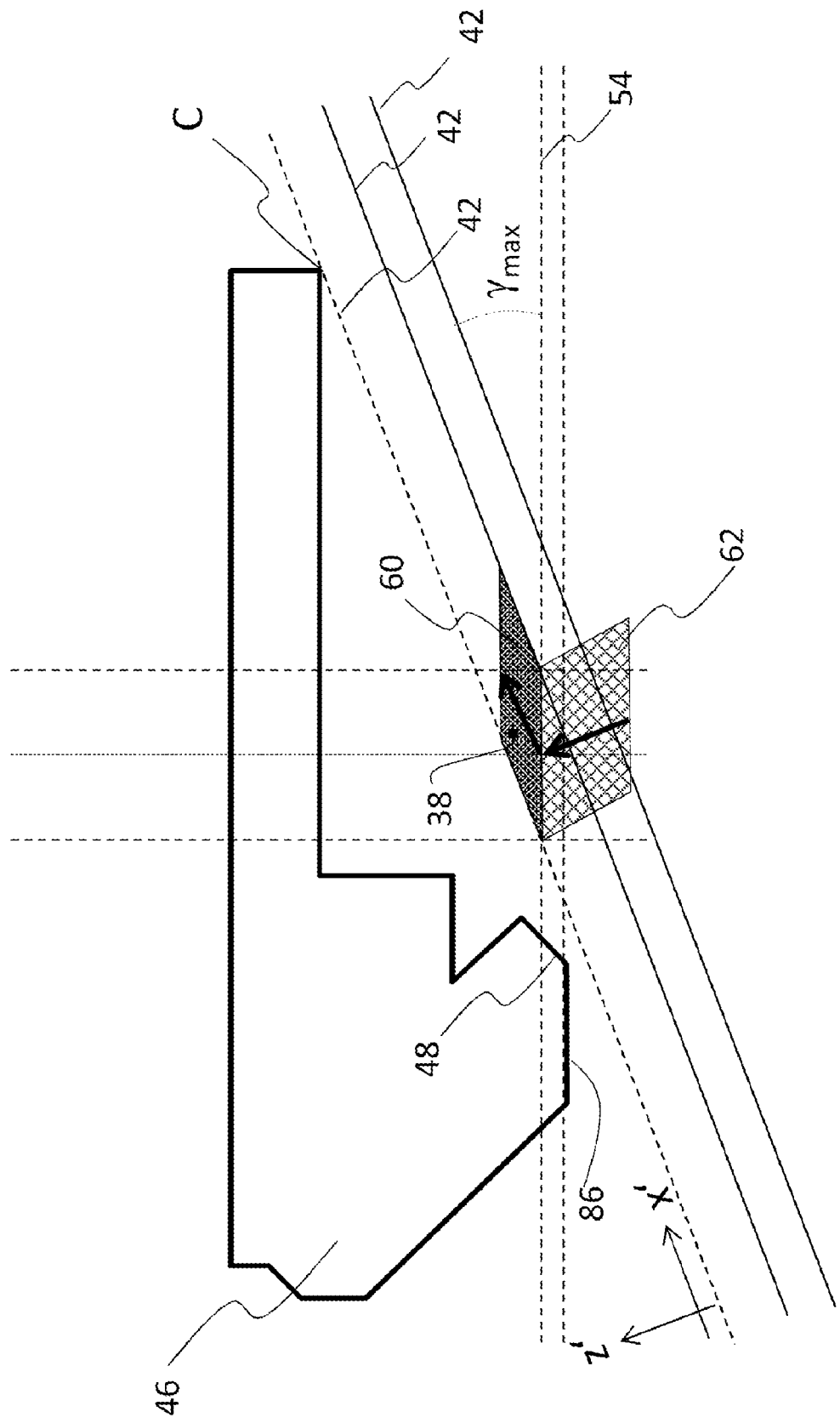
FIG. 10 shows an illustration corresponding to FIG. 9, wherein the carrier surface is set at a maximum angle of inclination.

FIGS. 9 and 10 show how the sample holder 40 can be displaced in the sample chamber 38 to successively record a series of individual images for the purpose of volume imaging. An arrangement is shown in FIG. 9 in this case with reference to FIG. 3, in which the carrier surface 42 is inclined by the minimal angle of inclination $\gamma_{min}$ in relation to the focal plane 54. In this arrangement, the stop A also shown in FIG. 3 thus comes into effect. In contrast, in FIG. 10 the carrier surface 42 is positioned at the maximum angle of inclination $\gamma_{max}$ in relation to the focal plane 54, whereby the stop C becomes active.

Reference is made in each of FIGS. 9 and 10 to a coordinate system, the x' axis of which is aligned in parallel and the z' axis of which is aligned perpendicularly in relation to the carrier surface 42 of the sample holder 40. Accordingly, FIGS. 9 and 10 illustrate, on the one hand, a displacement of the carrier surface 42 along the x' axis, i.e., parallel to the carrier surface 42 and, on the other hand, a displacement along the z' axis, i.e., perpendicular to the carrier surface 42 (respectively indicated by the two arrows). Individual images, which in their entirety result in an acquired image volume 60, result from the displacement of the carrier surface 42 along the x' axis. Accordingly, individual images, which in their entirety result in an image volume 62, result from the displacement of the carrier surface 42 along the z' axis.

Figure 11:
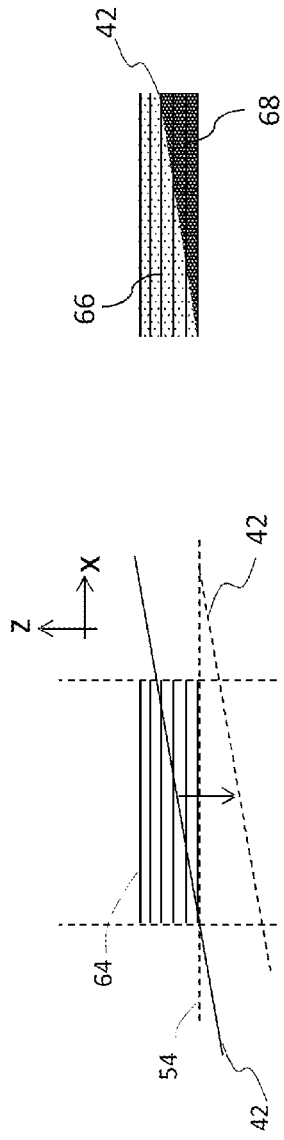
FIGS. 11*a*-11*d* show a schematic illustration to visualize the various options for displacing the carrier surface for volume imaging.
Figure 11:
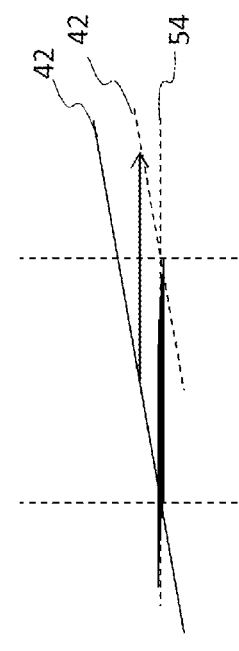
Figure 11:
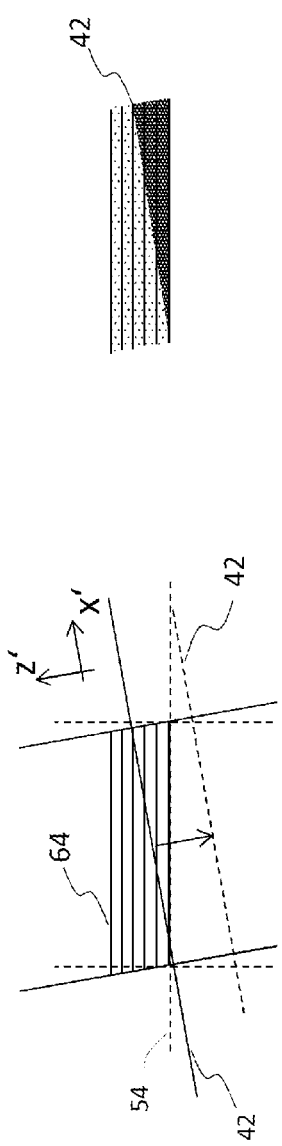
Figure 11:
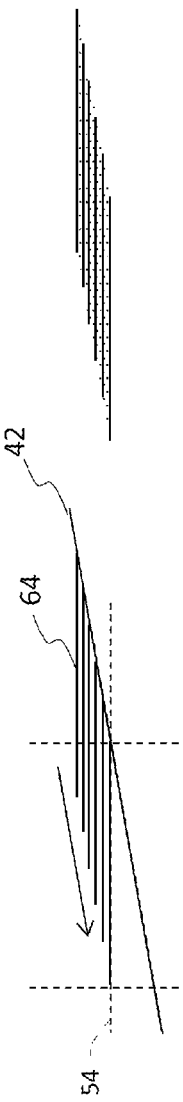

FIG. 11 is a solely schematic illustration in which four different options are illustrated in overview for recording a stack of individual images 64. In this case, FIG. 11 shows in the partial image a) an arrangement in which the carrier surface 42 is displaced in the z direction, i.e., along the optical axis $O_1$ of the detection objective 32. The region of the image volume located above the carrier surface 42 is identified by 66 and the region of the image volume located below the carrier surface 42 is identified by 68.

A displacement of the carrier surface 42 in the x direction, i.e., parallel to the focal plane 64, is shown in the partial image b) of FIG. 11. Such a displacement is not preferred, since no volume data may be obtained thereby.

In the arrangement shown in the partial image c) of FIG. 11, the carrier surface 42 is displaced in the z' direction, i.e., in a direction perpendicular to the carrier surface 42. An image stack located perpendicularly in relation to the carrier surface 42 may thus be generated, from the data of which images located parallel to the carrier surface 42, the position of which along the x axis is not dependent on z', in contrast to the case shown in the partial image a) can be obtained in the course of suitable data processing, for example, applying a so-called re-slice method.

Finally, a displacement of the carrier surface 42 along the x' axis is shown in the partial image d). This type of displacement is advantageous in particular if the specific provided geometric conditions are such that a collision of the sample arranged on the carrier surface 42 with the light deflection device 46 is not a concern.

Figure 12:
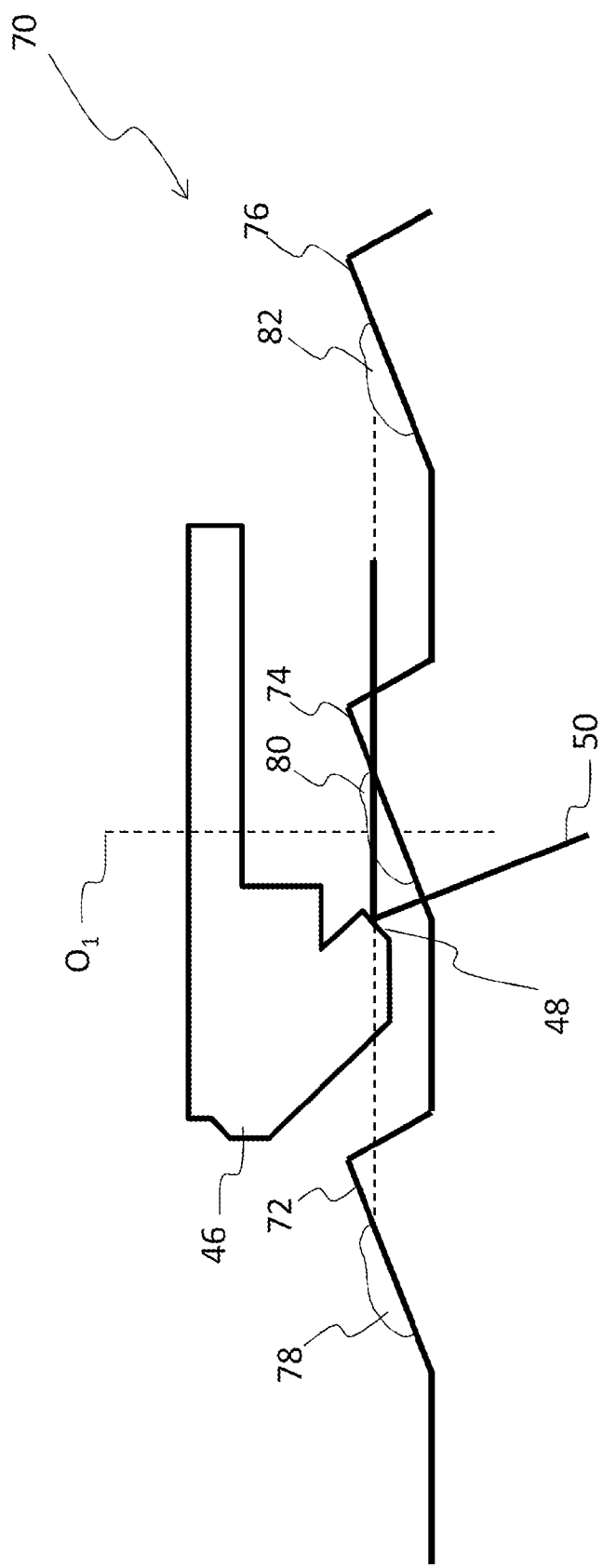
FIG. 12 shows an embodiment of the sample holder according to the invention.

FIG. 12 shows a sample holder 70, which forms, for example, an insert for a microscope table and comprises multiple inclined carrier surfaces 72, 74, 76. A sample 78, 80, or 82 may be arranged on each of these carrier surfaces 72, 74, 76, respectively. The sample holder 70 is embodied, for example, so that it may be inserted easily into an existing microscope table. To enable the passage of the illumination light beam 50, the sample holder 70 is formed transparent in its entirety or also only partially. For example, it is possible to embody only the part of the respective inclined carrier surface 72, 74, 76 as transparent through which the illumination light beam 50 passes, while the remaining part is opaque. It is thus possible to apply, for example, markings or shaped parts on the opaque part of the sample holder 70, by which the respective sample 78, 80, 82 is mechanically guided, to avoid slipping of the sample on the inclined carrier surface.

Figure 13:
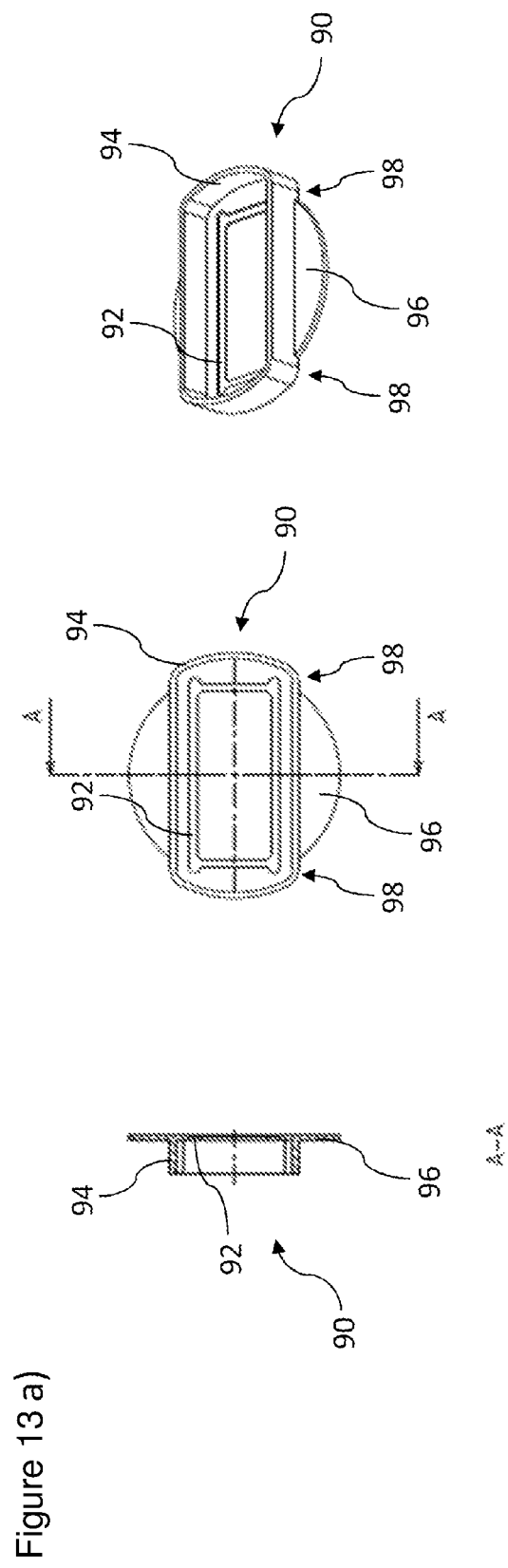
FIGS. 13*a*-13*b* show an embodiment of each of a conventional sample holder and a sample holder according to the invention having a microscope table insert.
Figure 13:
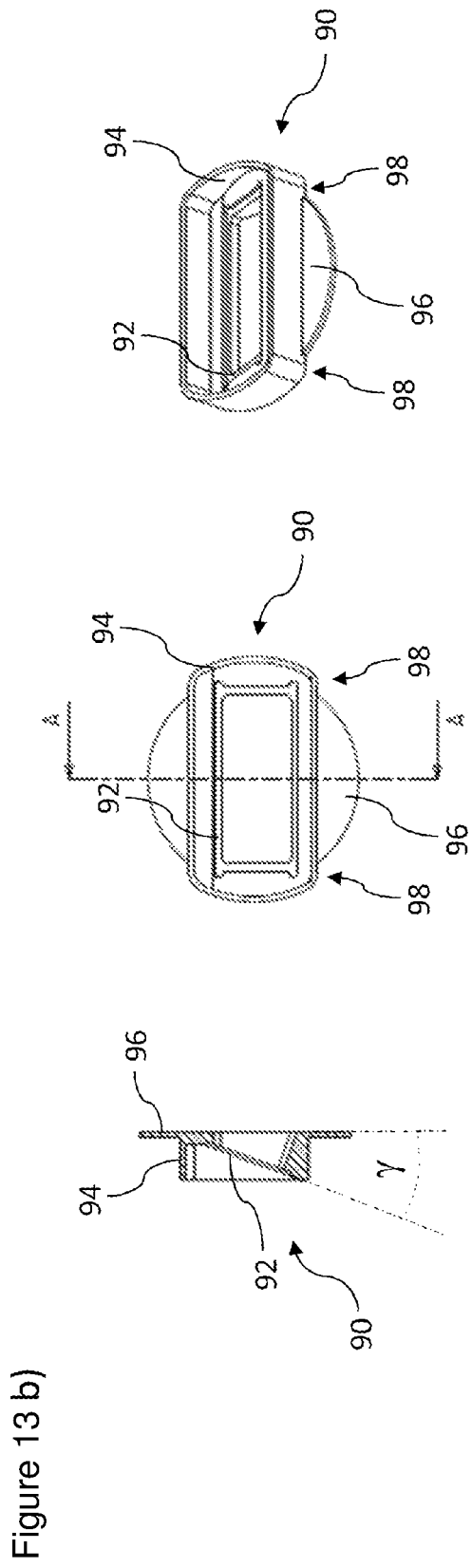

FIG. 13 shows, in part a), a conventional microscope table insert 90 for a sample holder in the middle in a top view, on the left in a sectional view along line A-A shown in the top view, and on the right in a perspective view. In part b) of FIG. 13, a microscope table insert 90 according to an embodiment of the invention for a sample holder according to an embodiment of the invention is illustrated in the middle in a top view, on the left in a sectional view along line A-A shown in the top view, and on the right in a perspective view.

In the conventional microscope table insert 90 shown in FIG. 13 a), a slide or a cover glass—having standard dimensions—can be inserted into the depressed edge region 92 and easily replaced. The sample is located on the slide or the cover glass. The microscope table insert 90 comprises a side wall 94, which is used, for example, to supply an aqueous sample medium into the inner region of the microscope table insert 90, so that the sample (not shown in FIG. 13), is located in the most lifelike possible environment during the microscopic examination. The depressed edge region 92 is formed substantially parallel to the surface of the partially-circular insert region 96. The partially-circular insert region 96 is used for inserting the microscope table insert 90 into a correspondingly formed recess on the microscope table (not shown in FIG. 13).

In the microscope table insert 90 according to an embodiment of the invention shown in FIG. 13 b), a slide or a cover glass, on which the sample is located, can also be inserted into the depressed edge region 92. This microscope table insert 90 also comprises a side wall 94, which is used, for example, to supply an aqueous sample medium into the inner region of the microscope table insert 90, so that the sample (not shown in FIG. 13) is located in the most lifelike possible environment during the microscopic examination. The depressed edge region 92 is formed substantially at an angle of inclination $\gamma$ in relation to the surface of the partially-circular insert region 96. A cover glass or slide inserted into the depressed edge region 92 is thus arranged at the predetermined angle of inclination γ in relation to the focal plane of the detection objective using a carrier surface.

It can be ensured by the two lateral regions 98 of the microscope table insert 90, which protrude beyond the circle circumference of the partially-circular insert region 96, that the microscope table insert 90 is always inserted in a predetermined orientation into a microscope table having corresponding recess. The microscope table and the microscope table insert 90 are preferably suitably calibrated, so that in a predetermined microscope table position, the height of the cover glass is known to a control unit of the lightsheet microscope, in particular to avoid a collision between deflection mirror and cover glass.

Finally, it is particularly to be noted that the above-explained exemplary embodiments are only used to describe the claimed teaching, but are not to restrict this teaching to the exemplary embodiments. In particular, all features contained in this description and/or the functions, effects, and properties thereof are considered to be disclosed herein considered as such and/or in combination with one another, which a person skilled in the art active in the present field would provide, possibly using his knowledge in the art, individually or in combination to solve the objective problem or problems related thereto.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 lightsheet microscope
12 illumination unit
14 light source
16 scanning unit
18 tube lens
20 illumination objective
22 scanning mirror
24 scanning mirror
26 scanning mirror
28 scanning lens
30 detection unit
32 detection objective
34 ocular
36 camera
38 sample chamber
40 sample holder
42 carrier surface
44 sample
46 light deflection device
48 deflection surface
50 illumination light beam
52 lightsheet
54 focal plane of (32)
56 image field
58 target region
60 image volume
62 image volume
64 individual images
66 part of the image volume
68 part of the image volume
70 sample holder
72 carrier surface
74 carrier surface
76 carrier surface
78 sample
80 sample
82 sample
84 entry pupil
86 end face of (46)
90 microscope table insert
92 edge region of (90)
94 side wall of (90)
96 insert region of (90)
98 lateral region of (90)
$O_1$ optical axis
$O_2$ optical axis
A stop
B vertex
C stop
AA operating distance of (32)

The invention claimed is:

1. A lightsheet microscope, comprising:
a detection objective configured to image a target region of a sample, which is located in a focal plane of the detection objective;
an illumination objective configured to focus an illumination light beam in the sample, the illumination objective being disposed opposite to the detection objective with an optical axis of the illumination objective being aligned with an optical axis of the detection objective, the optical axis of the illumination objective and the optical axis of the detection objective are perpendicular to the focal plane, the illumination objective and the detection objective defining a sample chamber containing the focal plane between the illumination objective and the detection objective;
a sample holder having at least one carrier surface arranged in the sample chamber, on which the sample is applicable; and
a light deflection device having a deflection surface which is arranged laterally offset in relation to the optical axis of the detection objective in the sample chamber and is configured to deflect the illumination light beam through the illumination objective in a direction perpendicular to the optical axis of the detection objective, wherein the light deflection device has a collision section facing toward a carrier surface of the at least one carrier surface, which defines a mechanical stop on the light deflection device for the carrier surface, which prevents a coplanar arrangement of the carrier surface in the focal plane, and wherein the carrier surface is inclined in relation to the focal plane at a predetermined angle of inclination in such a way that a part of the carrier surface is arranged in the focal plane.

2. The lightsheet microscope as claimed in claim 1, wherein the carrier surface is formed with an at least partially transparent part, wherein the illumination objective orients the illumination light beam through the at least partially transparent part of the carrier surface onto the deflection surface.

3. The lightsheet microscope as claimed in claim 2, wherein the illumination objective is configured to orient the illumination light beam in a perpendicular direction of incidence onto the transparent part of the carrier surface.

4. The lightsheet microscope as claimed in claim 3, wherein the sample holder is configured as a microscope table insert.

5. The lightsheet microscope as claimed in claim 2, wherein the carrier surface is configured in such a way that a smallest possible part of the illumination light beam is reflected on the carrier surface.

6. The lightsheet microscope as claimed in claim 1, wherein the light deflection device is attached to a part of the detection objective facing toward the sample.

7. The lightsheet microscope as claimed in claim 1, wherein the predetermined angle of inclination is within an angle range which extends from a lower limiting angle, at which the carrier surface is stopped with the collision section, up to an upper limiting angle.

8. The lightsheet microscope as claimed in claim 7, wherein a vertex of the angle of inclination at which the carrier surface intersects the focal plane is located on an edge of an image field facing toward the deflection surface, which defines the target region imaged by the detection objective.

9. The lightsheet microscope as claimed in claim 1, wherein an extension of the deflection surface in projection on the optical axis of the detection objective is essentially equal to a beam cross section, which the illumination light beam has in the projection on the deflection surface.

10. The lightsheet microscope as claimed in claim 1, further comprising an illumination unit disposed upstream of the illumination objective having a light source and a lightsheet generator, wherein the lightsheet generator is configured to generate a lightsheet-type illumination light distribution from the illumination light beam generated by the light source in cooperation with the illumination objective.

11. The lightsheet microscope as claimed in claim 10, wherein the illumination objective and the deflection surface cooperate in such a way that the lightsheet-type illumination light distribution formed by the focused illumination light beam in the focal plane has a minimal axial extension on the optical axis of the detection objective.

12. The lightsheet microscope as claimed in claim 10, wherein the lightsheet generator comprises a scanning unit.

13. The lightsheet microscope as claimed in claim 10, wherein the optical axis of the illumination objective is laterally offset in relation to the optical axis of the detection objective.

14. The lightsheet microscope as claimed in claim 1, wherein a lightsheet generator is configured to orient the illumination light beam onto a partial region of an entry pupil of the illumination objective, which is laterally offset in relation to the optical axis of the illumination objective out of a center of the entry pupil.

15. The lightsheet microscope as claimed in claim 14, wherein the lightsheet generator is configured to orient the illumination light beam tilted in relation to the optical axis of the illumination objective onto the partial region of the entry pupil.

16. The lightsheet microscope as claimed in claim 1, wherein, to displace the focal plane within the sample, the carrier surface is movable along an axis which is defined by the optical axis of the detection objective, by an axis perpendicular to the optical axis of the detection objective, or by an axis perpendicular to the carrier surface.

17. A retrofitting kit for a lightsheet microscope having a sample holder insert and a light deflection device, wherein the sample holder insert and the light deflection device are configured as claimed in claim 1 and can be retrofitted into a microscope or into a lightsheet microscope in such a way that the carrier surface is inclined in relation to the focal plane at a predetermined angle of inclination in such a way that a part of the carrier surface is arranged in the focal plane.

* * * * *